No. 752,332. PATENTED FEB. 16, 1904.
H. H. DOW.
PROCESS OF MANUFACTURING BROMIN FROM NATURAL BRINES.
APPLICATION FILED MAY 21, 1903.
NO MODEL.
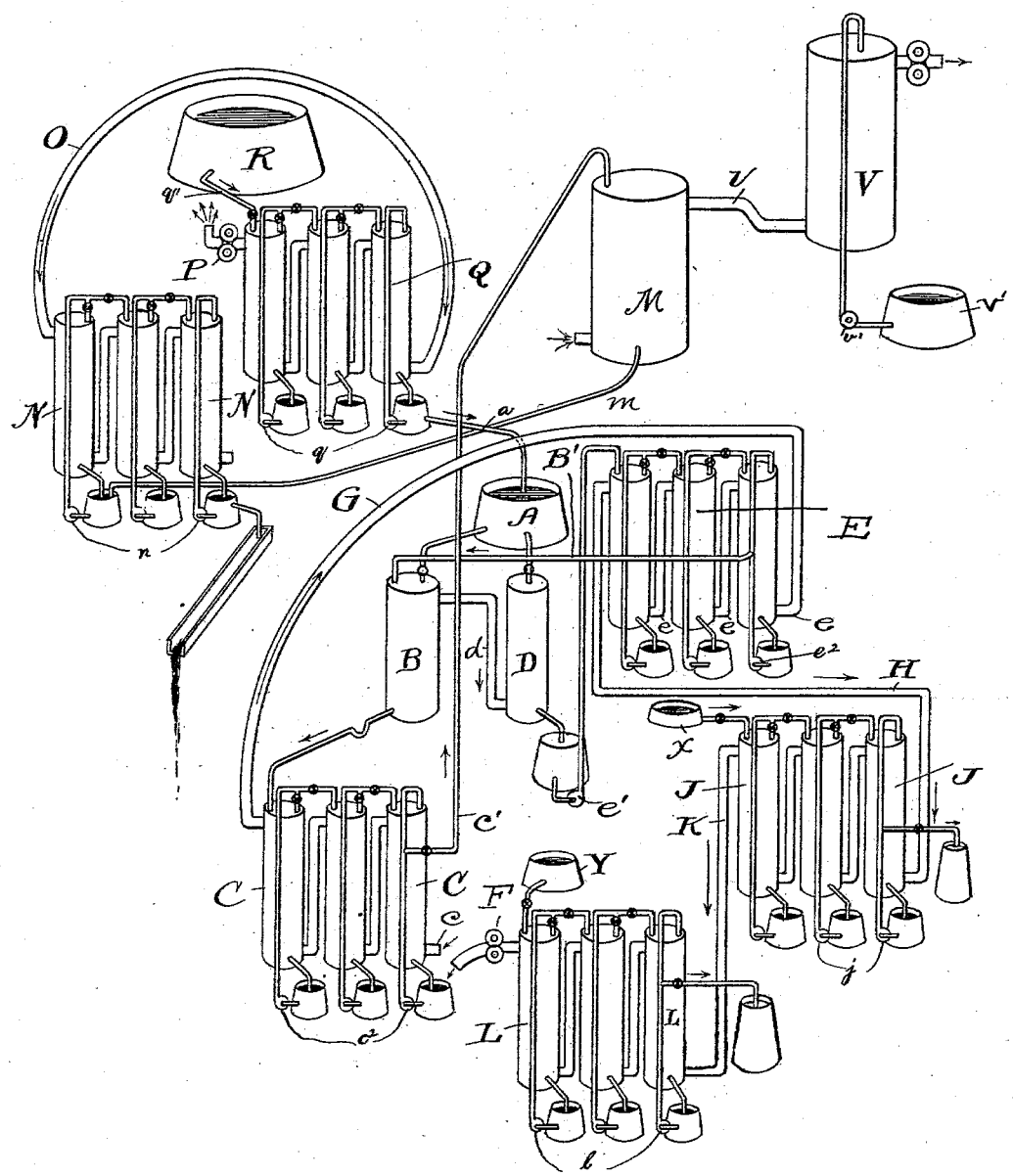
Witnesses.
E. B. Gilchrist
G. W. Saywell
Inventor.
Herbert H. Dow
by J. D. Fay
atty.

No. 752,332. Patented February 16, 1904.

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF MANUFACTURING BROMIN FROM NATURAL BRINES.

SPECIFICATION forming part of Letters Patent No. 752,332, dated February 16, 1904.

Application filed May 21, 1903. Serial No. 158,080. (No specimens.)

*To all whom it may concern:*

Be it known that I, HERBERT H. Dow, a citizen of the United States, and a resident of Midland, county of Midland, and State of Michigan, have invented a new and useful Improvement in Processes of Manufacturing Bromin from Natural Brines, of which the following is a specification, the principle of the invention being herein explained and the best mode in which I have contemplated applying that principle, so as to distinguish it from other inventions.

My invention consists of an improved process for more completely extracting bromin from natural bromid brines and the production of bromids of different grades of purity, part of which shall be nearly free from chlorin.

Said process consists of a series of steps hereinafter fully described.

The annexed drawing and the following description set forth in detail one mode of carrying out the invention, such disclosed means constituting but one of various ways in which the principle of the invention may be used.

In said annexed drawing is represented a diagrammatic view of a form of apparatus used in my improved process.

This invention is a modification of the one set forth in application Serial No. 158,077, of even date herewith, for processes of fractioning bromin apart from chlorin in that three air systems are used and three grades of bromin are obtained. As set forth in said application Serial No. 158,077, I have found that when a natural brine is oxidized sufficiently to set free substantially all the contained bromin and air is blown through the bromin thus set free the first portions of air escaping from the bromin solution will carry the purest bromin and that later portions of air will carry a very impure bromin. The impurity in both cases is chlorin or a volatile compound of chlorin or a combination of the two, some or all of which are produced in quite a large quantity when the brine is oxidized to its complete bromin content.

By my improved process I first blow the brine with a relatively small amount of air. This bromin-laden air not only contains a small amount of chlorin relative to the bromin contained in it, but also the percentage of bromin carried away by this air is very high as compared with the percentage of bromin carried away in the corresponding air-passages in my United States Letters Patent No. 714,160. After having thus recovered the purest bromin there still remains in the brine a large amount of free bromin, which should be removed. This bromin I blow out in separate air systems, and a part I recover in the form of a bromid by a suitable absorbent, and the remainder I recover by means of natural brines, which, as explained in my above-mentioned Letters Patent No. 714,160, contain impurities capable of absorbing the bromin.

By an "air system" I mean a blow-out tower or a series of such towers, such as M, C, or N, illustrated in the drawing, and to which more detailed reference will be made hereinafter, wherein a part of the bromin is blown out by means of air.

I shall now describe in detail those parts of the apparatus shown in the drawing accompanying this application which do not occur in the drawing accompanying Letters Patent No. 714,160 or such as have a different function than do the analogous parts in said patent. Auxiliary oxidizer M and its connections and the connection through the blower F between the absorption-towers L and the blow-out towers C, which are shown and described in the patented process, are omitted in this application. The rest of the apparatus, both in the main and auxiliary systems, performs the same functions in this process as those disclosed in the patent, and I shall therefore describe neither them nor their functions more in detail, the lettering in both being identical. The additional parts of apparatus used in this process, and in which parts the steps for which novelty is claimed are involved, are as follows: A second air system M is provided, connected with the first air system C by the connection $c'$ and with the third air system N (which is the second air system or blow-out tower in the patented process and also in Serial No. 158,077 of even date herewith) by the connection m. An air-inlet c is provided for the blow-out towers C. Connected with the blow-out tower M by means of a connection v is the additional absorption-tower V, provided with a suitable absorbing material from the receptacle V' by means of the pump v'. Pumps n, q, e², j, l, and c² at the bases of the systems of towers N, Q, E, J, L, and C, respectively, serve to convey the various solutions contained or flowing through said systems of towers successively to the one, two, three, or any number of towers comprising each of the respective systems.

My improved process is carried on as follows: Raw brine from the reservoir R is first allowed to pass through the duct q' into the absorber Q, where it takes up more or less bromin and chlorin, and passes on to the reservoir A through the duct a. From here it passes to the oxidizer B, where by any of the means explained in my reissued United States Letters Patent No. 11,232 it is oxidized, the oxidation being carried to a point where all or substantially all the bromin content is set free, more or less chlorin incidentally and of necessity being simultaneously set free. From the oxidizer the brine carrying all the dissolved bromin in the free state passes to the blow-out towers C. Here a limited amount of air is allowed to enter through the inlet c, and a part of the bromin which is the purest is carried with a relatively small amount of chlorin into the purifiers E through the pipe G and to the purifiers J through the pipe H, through pipe K, and to the absorption-tower L, which may contain any suitable absorbent for the bromin, such as caustic soda, exactly as described in Letters Patent No. 714,160. Part of the brine from the reservoir A is permitted to flow through a tailings-tower D, which is connected by means of a gas-passage d with the oxidizer B. The brine after passing through the tailings-tower is pumped by any suitable means, such as a pump e', into the purifiers E, consisting of a series of towers of construction similar to that of the blow-out towers and in which gas may be brought into intimate contact with the brine flowing therethrough. From the purifiers the brine is pumped through a pipe B' into the oxidizer B, so that it is seen all of the brine from the reservoir A eventually passes through the oxidizer B. The bromin and chlorin laden air passing through the purifiers E comes into contact with the brine flowing therethrough and is almost completely depleted of free chlorin by the substitution of the latter for the bromin in the bromid present in the brine, the chlorin in the air being thus utilized to liberate the bromin. I have found in practice, however, that such chlorin is not completely absorbed from the air, the absorption being completed in the second set of purifiers J, through which a strong bromid solution (provided from a suitable source, such as the receptacle X) is caused to circulate.

The brine in the blow-out towers C still contains a large amount of dissolved free halogens and is hence conducted through the pipe c' to the blow-out tower M, where it is brought into contact with an additional but limited amount of air and more bromin and some chlorin driven out, and this bromin and chlorin laden air is absorbed in the absorption-tower V. This absorption-tower V may also contain caustic soda or any other suitable absorbent. The brine from the tower M, containing the bromin which is the least pure of all, is now conducted through the duct m to the blow-out towers N, where the bromin and chlorin is removed as completely as possible by a large amount of air, the impure halogens thus removed being carried through the air-duct O to the absorption-towers Q, where they are taken up by and serve to oxidize the fresh brine coming down from the reservoir R.

It will be noted that additional blow-out towers might be provided if bromin of more than two grades of purity as final products were desired. In the especial application of the process here described the dissolved bromin is blown from the brine with the production of three distinct products. The purest bromin from the towers C serves well for the production of commercial bromids, that from the tower M for the production of an impure bromid suitable for the production of liquid bromin, and, finally, that from the towers N to be used to oxidize original untreated brine.

I claim—

1. The steps in the process of manufacturing bromin from natural brines which consist, in oxidizing the brine, then obtaining bromin of a graduated degree of purity by successively passing through the oxidized brine limited amounts of air, and successively recovering in suitable absorbents from the bromin-laden air the different grades of bromin thus carried off.

2. The steps in the process of manufacturing bromin from natural brines which consist, in oxidizing the brine, then obtaining bromin of a graduated degree of purity, by successively passing through the oxidized brine limited amounts of air, successively recovering in suitable absorbents from the bromin-laden air the purer grades of bromin thus carried off, passing through the brine a large amount of air, and recovering the remainder of the bromin most impure, thus carried off, by means of absorbing it in a natural brine.

3. The steps in the process of manufacturing bromin from natural brines which consist, in oxidizing the brine to excess of its bromin content before removing any of the bromin, then obtaining bromin of a graduated degree of purity, by successively passing through the oxidized brine limited amounts of air, successively recovering in suitable absorbents from the bromin-laden air the purer grades of bromin thus carried off, passing through the brine a large amount of air, and recovering the remainder of the bromin, most impure, thus carried off, by means of absorbing it in a natural brine.

4. The steps in the process of manufacturing bromin from natural brines which consist, in oxidizing the brine, passing a limited amount of air through the oxidized brine, recovering from the bromin-laden air in a suitable absorbent the purest bromin thus carried off, then recovering impure bromin of a graduated degree of purity by successively passing through the brine limited amounts of air, and successively recovering from the bromin-laden air in suitable absorbents the different grades of impure bromin thus carried off.

5. The steps in the process of manufacturing bromin from natural brines which consist, in oxidizing the brine, passing a limited amount of air through the oxidized brine, recovering from the bromin-laden air in a suitable absorbent the purest bromin thus carried off, then recovering impure bromin of a graduated degree of purity by successively passing through the brine limited amounts of air, successively recovering from the bromin-laden air in suitable absorbents the different grades of impure bromin thus carried off, passing through the brine a large amount of air, and recovering the remainder of the bromin most impure, thus carried off, by means of absorbing it in a natural brine.

6. The steps in the process of manufacturing bromin from natural brines which consist, in oxidizing the brine to excess of its bromin content before removing any of the bromin, passing a limited amount of air through the oxidized brine, recovering from the bromin-laden air in a suitable absorbent the purest bromin thus carried off, then recovering impure bromin of a graduated degree of purity by successively passing through the brine limited amounts of air, successively recovering from the bromin-laden air in suitable absorbents the different grades of impure bromin thus carried off, passing through the brine a large amount of air, and recovering the remainder of the bromin most impure, thus carried off, by means of absorbing it in a natural brine.

7. The steps in the process of manufacturing bromin from natural brines which consist, in oxidizing the brine, passing a limited amount of air through the oxidized brine, recovering from the bromin-laden air in a suitable absorbent the purest bromin thus carried off, again passing through the brine a limited amount of air, recovering from the bromin-laden air in a suitable absorbent the more impure grade of bromin thus carried off, passing through the brine a large amount of air, and recovering the remainder of the bromin most impure, thus carried off, by means of passing the bromin-laden air through a natural brine, in which latter the bromin is absorbed.

8. The steps in the process of manufacturing bromin from natural brines which consist, in oxidizing the brine to excess of its bromin content before removing any of the bromin, passing a limited amount of air through the oxidized brine, recovering from the bromin-laden air in a suitable absorbent the purest bromin thus carried off, again passing through the brine a limited amount of air, recovering from the bromin-laden air in a suitable absorbent the more impure grade of bromin thus carried off, passing through the brine a large amount of air, and recovering the remainder of the bromin most impure, thus carried off, by means of passing the bromin-laden air through a natural brine, in which latter the bromin is absorbed.

9. The steps in the process of manufacturing bromin from natural brines which consist, in oxidizing the brine, passing a limited amount of air through the oxidized brine, recovering from the bromin-laden air in caustic soda the purest bromin thus carried off, again passing through the brine a limited amount of air, recovering from the bromin-laden air in caustic soda the more impure grade of bromin thus carried off, passing through the brine a large amount of air, and recovering the remainder of the bromin most impure, thus carried off, by means of passing the bromin-laden air through a natural brine, in which latter the bromin is absorbed.

10. The steps in the process of manufacturing bromin from natural brines which consist, in oxidizing the brine to excess of its bromin content before removing any of the bromin, passing a limited amount of air through the oxidized brine, recovering from the bromin-laden air in caustic soda the purest bromin thus carried off, again passing through the brine a limited amount of air, recovering from the bromin-laden air in caustic soda the more impure grade of bromin thus carried off, passing through the brine a large amount of air, and recovering the remainder of the bromin most impure, thus carried off, by means of passing the bromin-laden air through a natural brine, in which latter the bromin is absorbed.

Signed by me this 19th day of May, 1903.

HERBERT H. DOW.

Attest:
D. T. DAVIES,
G. W. SAYWELL.